Figure 1:
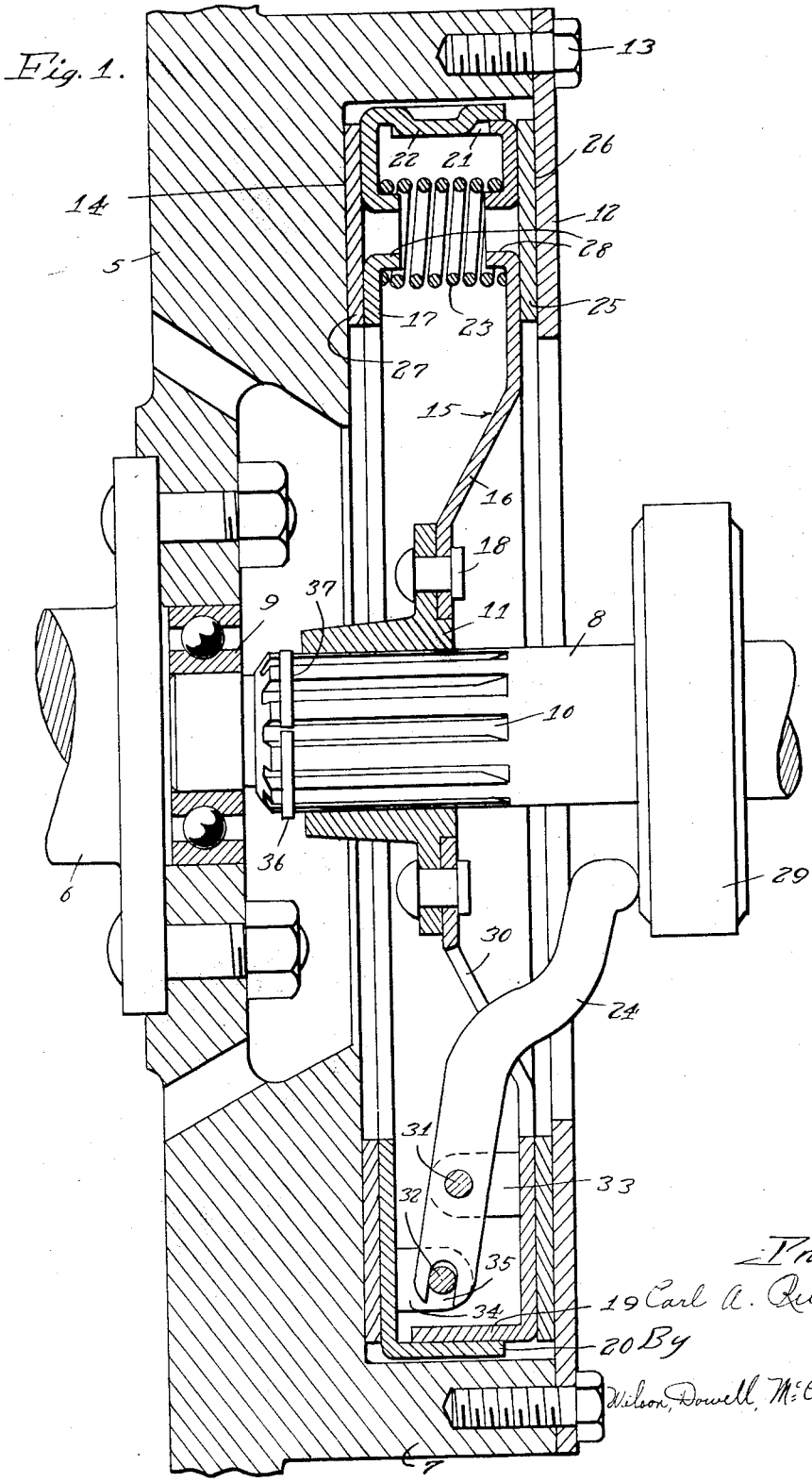

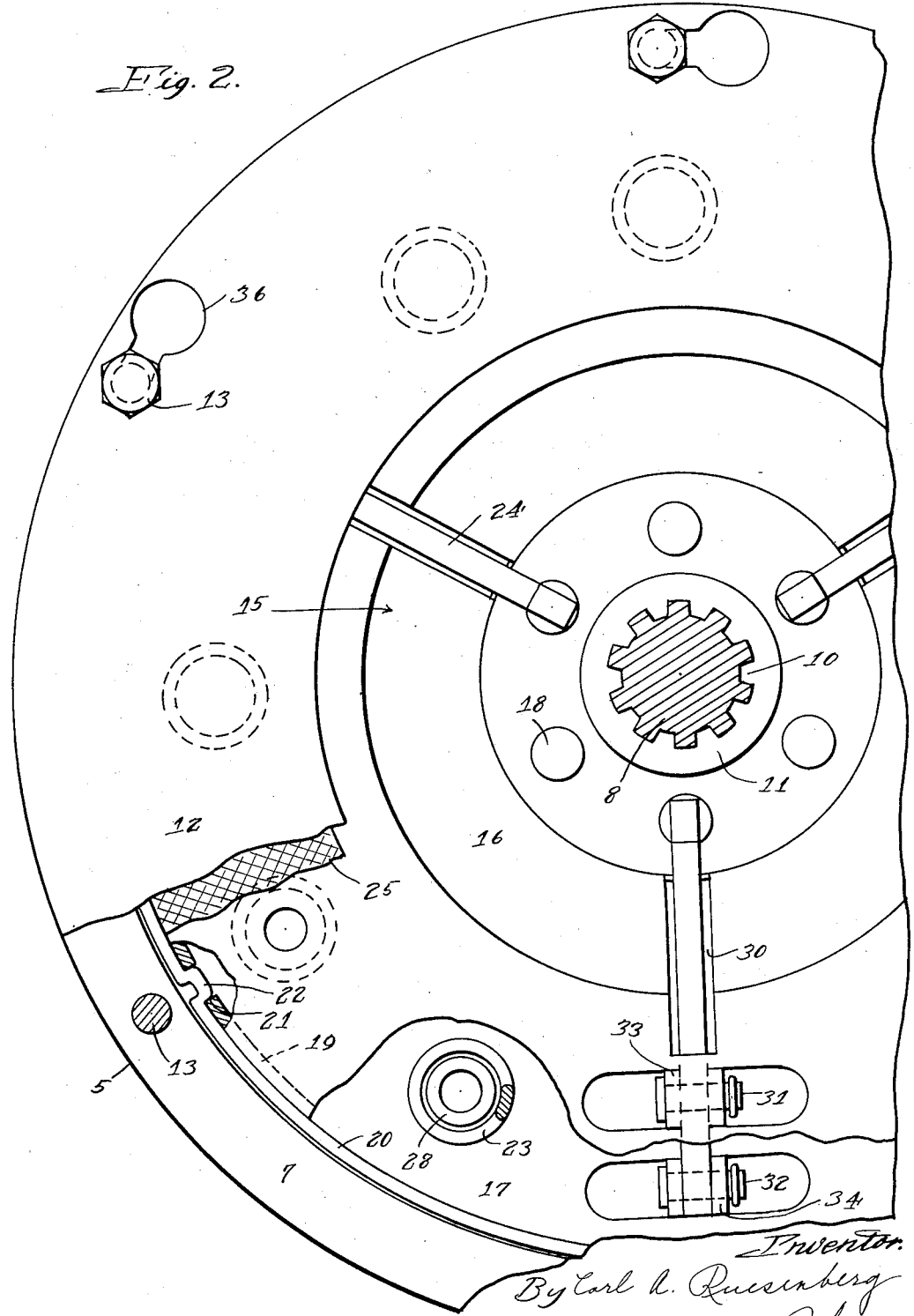

Patented Nov. 21, 1933

1,936,029

UNITED STATES PATENT OFFICE 1,936,029

FRICTION CLUTCH

Carl A. Ruesenberg, Rockford, Ill., assignor to Rockford Drilling Machine Co., Rockford, Ill., a corporation of Illinois Application April 14, 1930, Serial No. 444,159
Renewed June 19, 1933

27 Claims. (Cl. 192—70)

This invention relates to friction clutches for general usage, although the present design is especially adapted for use on motor vehicles.

The friction clutches commonly used on motor vehicles have the clutch disc provided with pads or facings on the opposite sides of the marginal portion thereof, where the same is arranged to be held in frictional engagement with a surface on the flywheel by means of a pressure plate normally urged toward the flywheel under the action of springs, bearing at one end against the back of the pressure plate and having the back plate of the clutch affording an abutment for the other end. In these clutches the release levers actuated by the throw-out collar are arranged simply to back the pressure plate away from the clutch disc. There have been various objections to this arrangement. For one thing, the clutch disc tended to stick more or less and consequently the disengagement was a bit uncertain; at any rate it was not positive. Furthermore, the fact that when the clutch disc became disengaged, it was perfectly free to keep spinning until its momentum was spent, was a serious objection, so much so that various means known as clutch brakes were devised to counteract this trouble. Then, too, there were the objections as to the amount of cost involved for machine work in connection with the pressure plate and other parts, and the amount of labor involved in assembling, as well as the excessive weight. It is, therefore, the principal object of my invention to provide a clutch which is so designed as to insure positive disengagement and immediate slowing down after disengagement, while still avoiding excessive weight and high machining and assembling costs.

In the clutch of my invention the pressure plate and the usual arrangement of springs that went with it are eliminated and in place of the ordinary disc I have provided a special disc made up of two sections, a ring section which has a facing for engagement with the flywheel and a plate section which has a facing for engagement with the back plate, the two sections being normally expanded axially under the action of springs disposed therebetween. Then, instead of having the usual release levers on the back plate and cooperating with the pressure plate, I provide release levers pivotally supported near the outer ends on the plate section of the clutch disc and pivotally connected at the outer end to the ring section, and provide an abutment on the driven shaft for the clutch disc center, so that upon initial movement of the levers the plate section of the clutch disc is disengaged and upon further movement, after engagement of the clutch disc center with its abutment, the ring section is disengaged, and vice versa on the return movement of the levers. Furthermore, I provide an annular flange on the plate section formed so as to provide a cylindrical guide surface concentric with the clutch disc center, and also provide an annular flange on the ring section formed to telescope with the aforesaid flange whereby to support the ring section as a unit with the plate section from the clutch disc center and guide the ring section for axial movement on the plate section for engagement and disengagement of the clutch.

This insures very smooth action of the clutch by the gradual engagement and disengagement, the disengagement being, moreover, absolutely positive and the clutch disc being also subjected to a definite braking effect. Numerous other advantages such as that of sheet metal stampings replacing cast and machined parts, as well as the simplicity, lightness, cheapness, and ease of assembling, will all be clearly pointed out in the course of the following detailed description which has reference to the accompanying drawings.

In the drawings—

Figure 1 is a section through a flywheel having the clutch of my invention assembled thereon; and Fig. 2 is a rear view showing certain parts broken away for the purpose of better illustration.

The same reference numerals are applied to corresponding parts in the two views.

Referring to the drawings, the reference numeral 5 is applied to the flywheel mounted in the usual way on the rear end of the engine crank shaft 6 and constituting the housing for and driving element of the clutch housed within the integral annular rim 7 projecting rearwardly from the flywheel, as shown, a shaft 8 constituting the driven element extends rearwardly from the clutch into the gear box of the transmission, there being ordinarily a housing about the flywheel and clutch assembly at the front end of the gear box, as is well known, and there being also a plate thereon which, when removed, affords access to the clutch for purposes of inspection or adjustment. It is common practice to have the front end of the shaft 8 received in a bearing 9 in the center of the flywheel and to have the shaft splined, as at 10, behind this bearing to take the hub or center 11 of the clutch disc. It is also common practice to fasten the back plate 12 to the rim of the flywheel by means of cap screws 13. In the ordinary clutch the back face 14 of the flywheel is ground smooth and square with the axis for drive purposes and the same is true of the front face of the pressure plate which, however, in accordance with my invention, is eliminated in the present clutch, its place being taken in part by a special clutch disc, indicated generally by the reference numeral 15.

The clutch disc 15 is made of two sections, a circular plate 16 and a circular ring 17, the former being slightly dished centrally and secured to the center 11, as by rivets 18. The plate 16 and ring 17 are stamped from sheet metal for lightness and cheapness and, as will presently appear, to avoid machining cost. A peripheral flange 19 formed on the plate 16 gives it the desired stiffness and strength and the same is true of the peripheral flange 20 provided on the ring 17. The flange 19 fits neatly within the flange 20, as shown, and at a plurality of points slots 21 are cut in the flange 19 for slidably receiving struck-in bosses 22 formed in the flange 20. In that way, the ring is held in a predetermined relation to the plate, but these two sections of the clutch disc are still free to have axial movement toward and away from one another. In other words, the clutch disc can expand or contract axially. A plurality of coiled compression springs 23, provided preferably in a certain arrangement with reference to release levers 24, are interposed between the plate 16 and ring 17 tending normally to force them apart, that is, to expand the clutch disc axially, whereby to bring the pad or facing 25 on the plate 16 into frictional engagement with the inside surface 26 of the back plate 12 and to bring the pad or facing 27 on the ring 17 into frictional engagement with the back face 14 of the flywheel for drive purposes. The plate and ring are suitably punched to provide circular bosses 28 to fit in the ends of the springs 23 so as to definitely locate and hold the same in position.

From the description thus far, it is evident that the elimination of the pressure plate greatly simplifies the clutch, cuts down weight, and eliminates one important element of machining cost. Another advantage growing out of this change is the elimination of the cups or thimbles otherwise required for the springs that cooperated with the pressure plate, these springs in accordance with my invention being disposed inside the two-piece clutch disc and being held in place in the novel manner described. It is also obvious that the arrangement makes for greater compactness, and neater appearance as well, because there are no parts projecting from the back plate. The arrangement is also advantageous from the standpoint that the springs are protected from the heated parts by the heat insulation of the pads or facings.

The release levers 24, arranged to be operated in the usual way by the throw-out collar 29, extend substantially radially therefrom through slots 30 provided in the plate 16 for pivotal connection with the plate at 31, near the outer ends of the levers and pivotal connection with the ring 17, as at 32, at the outer ends of said levers. The pivot 31 in each case is provided by a pin passed through registering holes in the lever 24 and through a pair of parallel lugs 33 struck inwardly from the plate 16, the lever being disposed between said lugs and suitable means being provided for retaining the pin 31 in place, as indicated in Fig. 2. The pivot 32 in each case is provided by a pin passed through registering holes in a pair of parallel lugs 34 struck inwardly from the ring 17, the lever having its end disposed between said lugs and being forked, as indicated at 35, to receive the pin, and suitable means being provided for holding the pin in place. The springs 23, it should now be observed, apply pressure to the plate and ring between the inner and outer edges of the facings 25 and 27 and hence between the pivots 31 and 32. The advantage of this relationship will be explained presently. In passing, it should also be noted that a split ring 36 is seated in an annular groove 37 provided in the shaft 8 in front of the clutch disc center 11.

In operation, assuming that the clutch is engaged as illustrated in Fig. 1, it is arranged to be disengaged by forward movement of the throw-out collar 29. The initial movement of the release levers 24 results in the disengagement of the facing 25 of the plate 16, the plate together with its center 11 being moved forwardly by means of the levers 24 against the action of the springs 23, until the center 11 comes into engagement with the ring 36, which serves as a stop or abutment for limiting the forward movement of the parts referred to. Thereafter, the continued movement of the release levers 24 results in the backing away of the ring 17 from the flywheel against the action of the springs 23 sufficiently to disengage the facing 27. In other words, the clutch disc is contracted axially out of frictional driving engagement with the drive surfaces 14 and 26 provided on the back face of the flywheel 5 and on the inside of the back plate 12, respectively. The disengagement is absolutely positive and the immediate freeing of the disc is accomplished regardless of whether or not the facing tends to stick, as often occurs. Moreover, it will be seen that after the disengagement of the clutch disc it does not spin freely until its momentum is spent, but it is subjected to a definite braking effect by reason of the fact that the release levers 24 assembled on the clutch disc are held firmly in engagement with the throw-out collar under the action of the compressed springs 23, and, of course, there is an appreciable resistance to the turning of the throw-out sleeve despite the fact that it usually has an anti-friction thrust bearing. Consequently, the clutch disc is immediately slowed down after disengagement without the use of a special clutch brake. When the clutch is to be engaged, the clutch pedal is released and the throw-out collar 29 permitted to back away in the usual way, thus permitting the facing 27 to come into engagement with the surface 14 and the facing 25 thereafter to come into engagement with the surface 26. The clutch is bound to have a very smooth action because of the gradual engagement and disengagement resulting from the engagement of one section of the plate before the other and disengaging it after the other. It is obvious that this avoids the objectionable grabbing so common in friction clutches. The gradual engagement and disengagement is further brought about as a result of the fact that the facings 25 and 27 are flexed or canted slightly out of their normal plane owing partly to the slight amount of yield of the sheet metal of which the plate 16 and ring 17 are made and partly to the special relationship of the pivots 31 and 32 to the springs 23. For example, when the pin 31 is pulled to the left and the pin 32 to the right, as viewed in Fig. 1, the spring pressure active between these points will naturally tend to deflect the inner edge of the ring 17 to the left and the periphery of the plate 16 to the right. Consequently, the facing 25 will disengage first at its inner edge portion and finally at its outer edge portion, whereas the facing 27 will disengage first at its outer edge portion and finally at its inner edge portion. Conversely, in the engagement of the clutch, the facing 27 will become engaged first at its inner edge portion and finally at its outer edge portion and thereafter the facing 25 will become engaged first at its outer edge portion and finally at its inner edge portion. This kind of engagement of a clutch disc is much sought after in clutch design and, so far as I am aware, has not been satisfactorily attained. In many cases, this sort of engagement is dependent upon resilience of the clutch disc built into it by special forming and treatment, but the objection to that lies in the fact that the disc after so much distortion and being subjected to heat takes a set and there can be no further gradual engagement. In the present case, the disc when the clutch is engaged is undistorted and consequently there is nothing to affect the gradual engagement and disengagement of the clutch. It naturally follows that a clutch properly designed for gradual engagement and disengagement will give longer service because the facings are not subjected to so much destructive action.

The present invention is of great advantage from the standpoint of ease in assembling. It is proposed to have the entire clutch disc assembly made up at the factory with suitable shim blocks inserted in the slots 30 between the plate 16 and the levers 24 to hold the plate 16 and ring 17 with the springs 23 compressed therebetween in substantially the condition in which these parts appear in Fig. 1, only not quite as much contracted. The clutch disc assembly is then shipped in this form along with the back plate 12 to the car manufacturer to be installed in the flywheel on the assembly floor. In assembling, after the clutch disc assembly has been inserted and the split ring 36 applied to the end of the shaft 8, the back plate 12, which has keyhole slots 36 therein large enough to permit the heads of the screws 13 to be passed therethrough, is passed over the heads of the screws, the latter being loosened more or less, and is turned to bring the screws into the small ends of the slots 36, whereupon the screws are tightened to fasten the back plate in place and thus complete the assembly. In the tightening of the screws 13 the clutch disc is contracted enough to loosen the shim blocks placed under the levers 24 and they can then be withdrawn. Obviously, very little time is consumed in the assembling of the clutch on the flywheel.

It is believed the foregoing description conveys a clear understanding of all of the objects and advantages of my invention. The following claims have been drawn with a view to covering all legitimate modifications and adaptations such as will, no doubt, occur to those skilled in this art after this disclosure.

I claim:

1. In a friction clutch, the combination with a flywheel driving element, a driven shaft element coaxially disposed with reference to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface, and the ring section engaging the other driving surface, the plate section having an annular flange on the periphery thereof providing a cylindrical guiding surface concentric with the center hub, and the ring section having an annular flange on the periphery thereof telescoping with the last mentioned flange whereby to support the ring section on the plate section in coaxial relation to the center hub, and guide the sections for axial movement relative to one another, spring means disposed between the plate and ring sections serving normally to urge said sections apart to engage the clutch, the said spring means being provided at points uniformly spaced circumferentially of the clutch disc, a plurality of release levers disposed substantially radially with respect to the clutch disc and in substantially uniformly spaced relation circumferentially of the disc at points between the spring means, each of said levers having pivotal support on the one section intermediate its ends and pivotal connection with the other section at its outer end, and means arranged to engage the inner ends of said levers and to move the same simultaneously in one direction to disengage the clutch.

2. A friction clutch assembly for a flywheel comprising, in combination, a clutch disc assembly formed of two sections, namely, a plate section having a suitable center hub, and a ring section, spring means disposed between said sections normally urging the same apart, and a plurality of release levers extending substantially radially of the clutch disc in between the sections and pivoted near the outer ends to the one section and at the outer ends to the other section, the said clutch disc assembly being arranged to receive removable shim blocks between the release levers and the one clutch disc section to hold the parts approximately in their ultimate positions preparatory to the assembling of the clutch disc assembly in the flywheel, and a back plate for the flywheel arranged when fastened in place to force the sections of the clutch disc toward each other sufficiently to release the shim blocks.

3. A friction clutch assembly for a flywheel comprising, in combination, a clutch disc assembly formed of two sections, namely, a plate section having a suitable center hub, and a ring section, spring means disposed between said sections normally urging the same apart, and a plurality of release levers extending substantially radially of the clutch disc in between the sections and pivoted near the outer ends to the one section and at the outer ends to the other section, the said clutch disc assembly being arranged to receive removable shim blocks between the release levers and the one clutch disc section to hold the parts approximately in their ultimate positions preparatory to the assembling of the clutch disc assembly in the flywheel, and a back plate for the flywheel arranged when fastened in place to force the sections of the clutch disc toward each other sufficiently to release the shim blocks, the said back plate having a plurality of keyhole slots provided therein spaced correspondingly to a plurality of cap screws provided on the flywheel, whereby, when the cap screws are loosened, the back plate is arranged to be slipped over the heads of the cap screws and turned slightly to position the plate with the cap screws disposed in the small ends of said slots, whereupon the cap screws may be tightened to complete the assembly.

4. In a friction clutch, the combination with a flywheel driving element, a driven shaft element coaxially disposed with reference to the flywheel, the flywheel having a driving surface on the back thereof, and a back plate on the flywheel providing a driving surface on the front thereof, of a clutch disc mounted on the driven shaft between the two driving surfaces, said disc comprising a plate section having a center hub mounted on the shaft, and a ring section, the plate section engaging the one driving surface and the ring section engaging the other driving surface, spring means disposed between the sections serving normally to urge the same apart to engage the clutch, and marginal clutch facings cooperating with the plate and ring sections, the plate and ring sections being made of sheet metal susceptible of a certain amount of deflection, release levers extending outwardly from the driven shaft in between the plate and ring sections and pivotally supported near their outer ends on the plate section and pivotally connected at their outer ends with the ring section, the pivotal connection of each of the release levers with the plate section being at a point near the inner marginal edge of the facing for the plate section, and the pivotal connection of said lever with the ring section being at a point near the outer marginal edge of the facing for the ring section, and the springs acting between said sections to force the same apart being disposed intermediate said pivot points, whereby to flex the outer edge portion of the plate section and the inner edge portion of the ring section outwardly relative to the plane of the rest of the said sections, whereby to produce engagement of the inner marginal portion of the ring section before engagement of the rest of said section and to produce engagement of the outer marginal portion of the plate section before engagement of the rest of said section.

5. In a friction clutch, the combination with a flywheel driving element, a driven shaft element coaxially disposed with reference to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, the plate section having an annular flange on the periphery thereof providing a cylindrical guiding surface concentric with the center hub, and the ring section having an annular flange on the periphery thereof telescoping with the last mentioned flange whereby to support the ring section on the plate section in coaxial relation to the center hub and guide the sections for axial movement relative to one another, marginal facings on the outside of the plate and ring sections, spring means disposed between the sections substantially midway between the inner and outer edges of the facings, and means for moving the sections toward each other against the action of the spring means to disengage the clutch.

6. In a friction clutch, the combination with a flywheel driving element, a driven shaft element coaxially disposed with reference to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, the plate section having an annular flange on the periphery thereof providing a cylindrical guiding surface concentric with the center hub, and the ring section having an annular flange on the periphery thereof telescoping with the last mentioned flange whereby to support the ring section on the plate section in coaxial relation to the center hub and guide the sections for axial movement relative to one another, marginal facings on the outside of the plate and ring sections, spring means disposed between the sections substantially midway between the inner and outer edges of the facings, release levers extending outwardly from the driven shaft in between the plate and ring sections, the same reaching forwardly through openings provided in the plate section for operation of the levers from behind the back plate, pivotal supports for the levers on the plate section near the outer ends of the levers, pivotal connections between the outer ends of the levers and the ring section, and means in front of the center hub for limiting forward movement thereof on the driven shaft.

7. In a friction clutch, the combination with a flywheel driving element, a driven shaft element coaxially disposed with reference to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, the plate section having an annular flange on the periphery thereof providing a cylindrical guiding surface concentric with the center hub, and the ring section having an annular flange on the periphery thereof telescoping with the last mentioned flange whereby to support the ring section on the plate section in coaxial relation to the center hub and guide the sections for axial movement relative to one another, marginal facings on the outside of the plate and ring sections, spring means disposed between the sections substantially midway between the inner and outer edges of the facings, release levers extending outwardly from the driven shaft in between the plate and ring sections, the same reaching forwardly through openings provided in the plate section for operation of the levers from behind the back plate, pivotal supports for the levers on the one section near the outer ends of the levers, pivotal connections between the outer ends of the levers and the other section, and means in front of the center hub for limiting forward movement thereof on the driven shaft.

8. A clutch as set forth in claim 1, wherein the flange on the one section is provided with one or more longitudinal slots, and the flange on the other section is provided with one or more substantially radial projections slidable in said slots serving to hold the sections against turning relative to one another.

9. A clutch as set forth in claim 4 including an annular flange provided on the periphery of the plate section providing a cylindrical guide surface concentric with the plate section, and an annular flange provided on the periphery of the ring section telescoping on the aforesaid flange, the flanges serving to reinforce the sections and also support the ring section on the plate section in coaxial relation to one another and guide the sections for axial movement relative to one another.

10. A clutch as set forth in claim 4 including an annular flange provided on the periphery of the plate section providing a cylindrical guide surface concentric with the plate section, and an annular flange provided on the periphery of the ring section telescoping on the aforesaid flange, the flanges serving to reinforce the sections and also support the ring section on the plate section in coaxial relation to one another and guide the sections for axial movement relative to one another, the one flange being provided with one or more longitudinal slots, and the other flange being provided with one or more substantially radial projections slidable in said slots, whereby to hold the sections against turning relative to one another.

11. A clutch as set forth in claim 5, wherein the flange on the one section is provided with one or more longitudinal slots, and the flange on the other section is provided with one or more substantially radial projections slidable in said slots serving to hold the sections against turning relative to one another.

12. In a friction clutch, the combination with a flywheel driving element, a driven shaft element coaxially disposed with reference to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, the plate section having an annular flange on the periphery thereof providing a cylindrical guiding surface concentric with the center hub, and the ring section having an annular flange on the periphery thereof telescoping with the last mentioned flange whereby to support the ring section on the plate section in coaxial relation to the center hub and guide the sections for axial movement relative to one another, marginal facings on the outside of the plate and ring sections, spring means disposed between the sections substantially midway between the inner and outer edges of the facings, release levers extending outwardly from the driven shaft in between the plate and ring sections, the same reaching forwardly through openings provided in the plate section for operation of the levers from behind the back plate, pivotal supports for the levers on the plate section near the outer ends of the levers, the outer ends of the levers being bifurcated and having sliding pivotal connections in said bifurcated ends with pins carried on the ring section, and means in front of the center hub section for limiting forward movement thereof on the driven shaft.

13. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, said sections being arranged to move apart for engagement of the clutch, and means for moving the sections toward each other to disengage the clutch, said sections having oppositely directed flanges on their outer peripheries telescoping on one another serving to support the ring section on the plate section concentric with the center hub and keep the sections coaxially disposed in all positions of the one section relative to the other.

14. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the one driving surface and the ring section engaging the other driving surface, said sections being arranged to move apart for engagement of the clutch, and means for moving the sections toward each other to disengage the clutch, said sections having oppositely directed flanges on their outer peripheries telescoping on one another serving to support the ring section on the plate section concentric with the center hub and keep the sections coaxially disposed in all positions of the one section relative to the other, there being a projection on one of the flanges slidably received in a recess provided in the other flange serving to hold the sections against rotation relative to one another.

15. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft, and a ring section, the plate section engaging the driving surface on the back plate and the ring section engaging the driving surface on the flywheel, said sections being guided for axial movement relative to one another while maintained in coaxial relation and arranged normally to move apart for engagement of the clutch, release levers extending outwardly from the shaft at a point behind the clutch disc through openings provided in the plate section for disposition of the outer ends between the plate and ring sections, said levers being pivotally connected to the plate section intermediate their ends and to the ring section at their outer ends, means for operating the release levers disposed behind the plate section and arranged to communicate forward movement to said levers and hence to the plate section for disengagement of the latter, and means providing an abutment for the center hub of the plate section for limiting the forward movement of said section in the disengagement of the clutch and determining the point in the movement of the levers at which the ring section is disengaged.

16. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft and having a marginal driving portion for engagement with one of said driving surfaces, and a ring section of approximately the same width as the marginal portion of said plate section for engagement with the other driving surface, means for supporting the ring section on the plate section in coaxial relation to the center hub and guiding said sections for axial movement relative to one another, said sections being adapted normally to have engagement with the driving surfaces, and levers disposed between said sections but extending therefrom for operation outside the clutch disc, the same being pivotally supported directly on the plate section and pivotally connected with the ring section to move the sections toward each other to disengage the clutch.

17. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising a plate section having a center hub mounted on the shaft and having a marginal driving portion for engagement with one of said driving surfaces, and a ring section of approximately the same width as the marginal portion of said plate section for engagement with the other driving surface, means for supporting the ring section on the plate section in coaxial relation to the center hub and guiding said sections for axial movement relative to one another, said sections being adapted normally to have engagement with the driving surfaces, and levers disposed between said sections but extending therefrom for operation outside the clutch disc, the same being pivotally supported directly on the one section and pivotally connected with the other section to move the sections toward each other to disengage the clutch.

18. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising two sections having annular flanges on the outer periphery thereof telescoping with one another whereby to hold the sections in coaxial relation and guide them for axial movement relative to one another, the one section being arranged normally to engage the one driving surface and the other section being arranged normally to engage the other driving surface, means for moving the sections toward each other to disengage the clutch, and means for transmitting drive from the sections to the driven shaft and supporting said sections in concentric relation thereto.

19. In a friction clutch, the combination with a flywheel driving element, a driven shaft element coaxially disposed with respect to the flywheel, the flywheel having a driving surface on the back face thereof, and a back plate on the flywheel providing a driving surface on the inside thereof, of a clutch disc mounted on the driven shaft between the two driving surfaces, said disc comprising two sections having annular flanges on the outer periphery thereof telescoping with one another whereby to hold the sections in coaxial relation and guide them for axial movement relative to one another, the one section being arranged normally to engage the one driving surface and the other section being arranged normally to engage the other driving surface, means for moving the sections toward each other to disengage the clutch, means for holding said sections against turning relative to one another, and means for transmitting drive from the one section to the driven shaft.

20. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising a plate section having a center hub mounted on the shaft, and a ring section, the plate section engaging the one drive surface and the ring section engaging the other drive surface, said sections being arranged to move apart for engagement of the clutch and toward each other for disengagement, and means for moving the sections relative to each other, said sections having annular flanges on the outer periphery thereof extending therefrom toward each other and interfitting so as to keep the sections coaxially disposed and prevent rotation relative to one another.

21. In a friction clutch, the combination with a housing element, a shaft element coaxially disposed with respect to the housing element, the one element being the driving element and the other the driven element, the housing having a friction drive surface on the back face thereof, and a back plate on the housing having a related parallel friction drive surface on the inside thereof, of a clutch disc mounted on the shaft between the two drive surfaces, said disc comprising a plate section having a center hub mounted on the shaft, and a ring section, the plate section and ring section being parallel and the one engaging the first drive surface and the other the second drive surface, said sections being arranged to move apart for engagement of the clutch and toward each other for disengagement, and means for moving the sections relative to each other, said sections having annular peripheral flanges extending substantially at right angles to the plane thereof toward each other, the flanges interfitting so as to keep the sections coaxially disposed and prevent rotation of the one section relative to the other.

22. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising a plate section having a center hub mounted on the shaft, and a ring section, the plate section engaging the one drive surface and the ring section engaging the other drive surface, said sections being arranged to move apart for engagement of the clutch and toward each other for disengagement, and means for moving the sections relative to each other, said sections having flanges on the outer periphery thereof projecting toward each other and telescoping on one another to support the ring section on the plate section in coaxial relation thereto in all positions of the one section relative to the other.

23. In a friction clutch, the combination with a housing element, a shaft element coaxially disposed with respect to the housing element, the one element being the driving element and the other the driven element, the housing having a friction drive surface on the back face thereof, and a back plate on the housing having a friction drive surface on the inside thereof, of a clutch disc mounted on the shaft between the two drive surfaces, said disc comprising a plate section having a center hub mounted on the shaft, and a ring section, the plate section engaging the one drive surface and the ring section engaging the other drive surface, said sections being arranged to move apart for engagement of the clutch and toward each other for disengagement, and means for moving the sections relative to each other, said sections having flanges on the outer periphery thereof projecting toward each other and telescoping on one another to support the ring section on the plate section in coaxial relation thereto in all positions of the one section relative to the other, there being a projection on one of the flanges slidably received in a recess provided in the other flange serving to hold the sections against rotation relative to one another.

24. In a friction clutch, the combination with a flywheel driving element, and a driven shaft coaxially disposed with respect to the flywheel, there being a front and a rear drive surface on the flywheel, of a clutch disc mounted on the shaft between the two drive surfaces, said disc comprising a main section having a center hub mounted on the shaft and engaging the rear drive surface, and an auxiliary section engaging the front drive surface, spring means normally urging the sections apart for engagement of the clutch, release levers disposed with their outer ends between the clutch disc sections, pivotally connected at their outer ends on the auxiliary section and near their outer ends on the main section, and extending out from between the sections inwardly toward the shaft, means manually operable behind the clutch disc for communicating movement to the inner ends of said levers, and a stop in front of the clutch disc for limiting forward movement of the main section.

25. In a friction clutch, the combination with a housing element, and a shaft element coaxially disposed with respect to the housing element, the one element being the driving element and the other the driven element, there being a front and a rear drive surface on the housing element, of a clutch disc mounted on the shaft between the two drive surfaces, said disc comprising a main section having a center hub mounted on the shaft and engaging the rear drive surface, and an auxiliary section engaging the front drive surface, spring means normally urging the sections apart for engagement of the clutch, release levers disposed with their outer ends between the clutch disc sections, pivotally connected at their outer ends on the auxiliary section and near their outer ends on the main section, and extending out from between the sections inwardly toward the shaft, means manually operable behind the clutch disc for communicating movement to the inner ends of said levers, and a stop in front of the clutch disc for limiting forward movement of the main section.

26. In a friction clutch, the combination with a flywheel driving element and a driven shaft coaxially disposed with respect to the flywheel, there being a front and a rear drive surface on the flywheel, of a clutch disc mounted on the shaft between the two drive surfaces, said disc comprising a main section having a center hub mounted on the shaft and engaging the one drive surface, and an auxiliary section engaging the other drive surface, spring means normally urging the sections apart for engagement of the clutch, release levers disposed with their outer ends between the clutch disc sections, pivotally connected at their outer ends on the auxiliary section and near their outer ends on the main section, and extending out from between the sections inwardly toward the shaft for operation from behind the clutch disc, means manually operable behind the clutch disc for communicating movement to the inner ends of said levers in a certain direction, and a stop for engagement by the center hub to limit movement of the main section in that direction.

27. In a friction clutch, the combination with a housing element and a shaft element coaxially disposed with respect to the housing element, the one element being the driving element and the other the driven element, there being a front and a rear drive surface on the housing element, of a clutch disc mounted on the shaft between the two drive surfaces, said disc comprising a main section having a center hub mounted on the shaft and engaging the one drive surface, and an auxiliary section engaging the other drive surface, spring means normally urging the sections apart for engagement of the clutch, release levers disposed with their outer ends between the clutch disc sections, pivotally connected at their outer ends on the auxiliary section and near their outer ends on the main section, and extending out from between the sections inwardly toward the shaft for operation from behind the clutch disc, means manually operable behind the clutch disc for communicating movement to the inner ends of said levers in a certain direction, and a stop for engagement by the center hub to limit movement of the main section in that direction.

CARL A. RUESENBERG.